United States Patent
Ebert et al.

(10) Patent No.: US 6,949,229 B2
(45) Date of Patent: Sep. 27, 2005

(54) DEVICE FOR EVAPORATING A LIQUID

(75) Inventors: Andreas Ebert, Kirchheim (DE);
Oskar Lamla, Kirchheim-Nabern (DE);
Martin Schüssler, Hämpfergasse (DE);
Tomas Stefanovski, Böblingen (DE)

(73) Assignee: Ballard Power Systems AG,
Kirchheim/Teck-Nabern (DE)

( * ) Notice: Subject to any disclaimer, the term of this patent is extended or adjusted under 35 U.S.C. 154(b) by 518 days.

(21) Appl. No.: 09/957,463

(22) Filed: Sep. 21, 2001

(65) Prior Publication Data

US 2002/0046493 A1 Apr. 25, 2002

(30) Foreign Application Priority Data

Sep. 21, 2000 (DE) .......................................... 100 46 692

(51) Int. Cl.[7] ................................................ B01J 8/00
(52) U.S. Cl. ........................ 422/188; 422/198; 422/211
(58) Field of Search ............................... 422/188, 190, 422/193, 198–204, 211

(56) References Cited

U.S. PATENT DOCUMENTS

| | | | | |
|---|---|---|---|---|
| 5,741,474 A | * | 4/1998 | Isomura et al. ......... | 423/648.1 |
| 6,428,758 B1 | * | 8/2002 | Schuessler et al. ......... | 422/239 |

FOREIGN PATENT DOCUMENTS

| | | | | |
|---|---|---|---|---|
| DE | 196 54 361 A1 | 6/1998 | ........... | C25D/11/02 |
| DE | 199 04 398 A1 | 8/2000 | ........... | B01J/8/00 |
| DE | 199 07 665 A1 | 8/2000 | ........... | B01J/8/00 |
| EP | 0 217 532 A1 | 4/1987 | ........... | C01B/3/32 |
| EP | 0 687 648 A1 | 12/1995 | ........... | C01B/3/32 |
| EP | 0 878 442 A1 | * 11/1998 | ........... | C01B/3/32 |
| EP | 0878442 A1 | 11/1998 | ........... | C01B/3/32 |
| EP | 0 906 890 A1 | 4/1999 | ........... | C01B/3/32 |
| EP | 1 031 374 A2 | * 8/2000 | ........... | B01J/8/02 |
| EP | 1031374 A2 | 8/2000 | ........... | B01J/8/02 |
| JP | 2000-237582 | * 9/2000 | ........... | B01J/19/24 |

OTHER PUBLICATIONS

European Search Report mailed Dec. 15, 2003.
(Ullmann's Elcyklopaedie der technischen Chemie, vol. 12, pp. 113–136, Verlag Chemie, Weinheim 1976) only drawings were considered–no translation of German text.

\* cited by examiner

*Primary Examiner*—Kevin P. Kerns
(74) *Attorney, Agent, or Firm*—Crowell & Moring LLP

(57) ABSTRACT

A device having a plurality of chambers for carrying out a solid-catalyzed reaction includes a common evaporation unit for evaporating liquid starting materials. The evaporation unit is in thermally conductive contact with a plurality of chambers. An area of the evaporation unit in which the evaporation substantially takes place is at least partially surrounded by the plurality of chambers.

16 Claims, 2 Drawing Sheets

DEVICE FOR EVAPORATING A LIQUID

BACKGROUND AND SUMMARY OF INVENTION

This application claims the priority of German Patent Document No. 100 46 692.3, filed on Sep. 21, 2000, the disclosure of which is expressly incorporated by reference herein.

The present invention relates to a device for evaporating a liquid having (1) a plurality of chambers for carrying out a solid-catalyzed reaction, and (2) a common evaporation unit for evaporating liquid starting materials. The evaporation unit is in thermally conductive contact with the plurality of chambers.

Solid-catalyzed processes and the devices required for these processes are in increasingly widespread use in engineering.

One example is the use of fuel cells for supplying energy to homes and motor vehicles (Ullmann's Encyclopedia der technischen Chemie, Volume 12, pp. 113–136, Verlag Chemie, Weinheim 1976). Another example is that of galvanic cells to reduce carbon monoxide emissions.

In installations of this type, a simple, compact design which takes up little space while at the same time needing small quantities of catalyst material, which is often expensive, and a high conversion rate are important.

This is illustrated, by way of example, with reference to hydrocarbon reforming reactors. For example, to generate hydrogen from hydrocarbons (for example methanol) and water, it is proposed in EP 0 906 890 A1 to press the reaction starting materials through layers which are stacked on top of one another and contain catalyst material. Consequently, the flow resistances, which often cause problems when supplying and discharging liquid starting materials and products, are of no importance.

DE 196 54 361 A1 likewise describes a stacked reactor in which the individual layers which are stacked on top of one another are connected via reaction channels which are in fluid communication. Unpublished document DE 199 04 398 discloses a stacked reactor comprising discs which are arranged flush above one another and are provided with a single aperture and contain catalyst material. Liquid reaction starting materials can be metered onto the individual discs via the reaction channel which is formed from the apertures and is provided with a metering lance. Stacked reactors of this type are versatile on account of their modular, compact structure.

Generally, hydrocarbon reforming takes place in two or more stages. In a first stage, only partial conversion of the hydrocarbon is aimed for in a first reactor. In a second stage, the reaction mixture containing starting materials and products is passed to a second reactor, which is optimized for the remaining conversion, as described, for example, in EP 0 687 648 A1. EP 0 217 532 B1 has disclosed a further reactor which comprises two reaction zones one above the other.

However, the reactors which have been disclosed hitherto have the problem that, when using one or more reaction starting materials which are in the liquid state, the reactor cannot be operated at its rated capacity, since the liquid cannot be directly applied to the catalytic layer by the conventional metering methods, for example nozzles.

Furthermore, there are problems when starting the reactor, since the surface area which comes into contact with the liquid is insufficient to evaporate the liquid which is, for example, sprayed on. This leads to the reactor not commencing operation even after the catalytic reaction has started, on account of the quantity of liquid suddenly being too great, and even, in extreme cases, to the catalytic reaction failing altogether. Therefore, in many solid-catalyzed reactions, it is often desirable for a reaction starting material to be supplied to a catalyst layer already substantially in vapor form.

DE 199 07 665 A1 discloses a device with a stacked reactor in which an evaporator is heated by heat exchange with hot synthesis gas. In one proposed embodiment, the evaporator, at the end side, butts against the flat side of the outermost reactor disc and is heated in a countercurrent by the hot synthesis gas formed in the reactor. For this purpose, the synthesis gas is collected, discharged from the reactor, and guided past the outer wall of the evaporator.

The present invention is based on an object of providing a device for carrying out a solid-catalyzed reaction which allows uniform, continuous evaporation of a starting material in such a manner that subsequent uniform distribution of a starting material over a plurality of catalyst layers is achieved.

According to the present invention, a device for carrying out a solid-catalyzed reaction includes a plurality of chambers for carrying out the solid-catalyzed reaction and a common evaporation unit for evaporating liquid starting materials. The evaporation unit is in thermally conductive contact with a plurality of chambers. An area of the evaporation unit in which the evaporation substantially takes place is at least partially surrounded by the plurality of chambers.

The device according to the present invention ensures that the evaporation of a starting material takes place continuously and completely in the entire evaporation unit, so that then, by a suitable distribution system, starting-material vapor is passed homogeneously and uniformly into reaction chambers with catalyst layers and can be fed through or onto the catalyst layers. Moreover, the use of evaporated starting material significantly increases the reaction rate of the reaction in question on the catalyst layer.

In the text which follows, the term "catalyst layer" refers to a layer of any desired geometric shape, structure, and composition which comprises material which reduces the activation energy of a previously selected reaction which takes place on the surface of or inside this layer. This material may also be described by the term "catalyst".

In the text which follows, the term "evaporation unit" is understood as meaning any suitable device at or in which, through the supply of heat, a substance which is in the liquid state can be converted into the vapor phase.

The evaporation unit takes the heat required to evaporate starting materials from the exothermic catalytic reaction which takes place at the catalyst layers. The chambers which contain catalyst layers may also be referred to as modules. The reaction is commenced by methods which are known per se, and the heat from this reaction then feeds the evaporator via the thermally conductive connection. In this case, the heat is introduced substantially directly through contact with the hot reactor zone. The evaporation unit is situated in the region of the hot reactor zone, and the evaporation therefore takes place in this region.

The thermally conductive connection is effected in such a manner that the resulting temperature distribution in the evaporation unit is ideal for operation of the device, for example for a stacked reactor of modular construction. In the case of a modular reactor, it should preferably be ensured that the temperature is identical in all the modules.

However, it is also possible to establish a temperature gradient between the modules. If more heat is to be extracted from one module, the thermal coupling to the evaporator may be greater in that module than in other modules, in which, for example, less heat is to be extracted.

Furthermore, it is possible for only one starting material to be evaporated beforehand, while another starting material is fed directly onto the catalyst layer, separately or together with the first evaporated starting material, via other means. In general, however, the entire reaction mixture is evaporated in advance. In specific cases, however, this will be dependent on the reaction which is to be carried out.

In a preferred configuration, the evaporation unit comprises a plurality of channels as shown in FIG. 3 which are arranged parallel to one another, since it is expedient to supply a plurality of smaller channels of the evaporation unit with heat than to supply a large central evaporation unit.

The preferred reactor can be started quickly and efficiently and can therefore be operated with its rated capacity within a very short time.

The spatial arrangement of the evaporation unit on the modules of a reactor can be as desired. For example, it is conceivable to use arrangements on the outer edge of the modules or of the entire device.

The evaporation unit is preferably rigidly connected to the chambers and/or the catalyst layer, since this allows thermally conductive connection with the hot reactor zone without great heat losses.

Depending on the reaction and the heat which is liberated in the reaction, it may also be advantageous to make the connection movable, so that extreme stresses caused by thermal gradients between catalyst layer and evaporation unit, which could cause irreversible damage to the evaporation unit, are avoided.

The device according to the present invention is suitable for all known solid-catalyzed processes, in particular, however, for reforming hydrocarbons. The term hydrocarbons is also understood as meaning compounds such as alcohols, aldehydes, ketones, ethers, and the like. The device can be used to produce hydrogen for fuel cells.

The result is a procedure which is efficient and simple to design, so that the starting material, which is evaporated continuously and completely, can be fed to the catalyst layers via suitable distribution systems. The uniform evaporation allows continuous and controllable supply of evaporated starting material with a uniform distribution to all the modules of a reactor, which is therefore ready for operation more quickly.

It will be understood that the features which have been referred to above and those which are still to be explained below can be used not only in the combination indicated in each case but also in other combinations or on their own without departing from the scope of the present invention.

Other objects, advantages and novel features of the present invention will become apparent from the following detailed description of the present invention when considered in conjunction with the accompanying drawings.

DETAILED DESCRIPTION OF THE INVENTION

Figure 1:
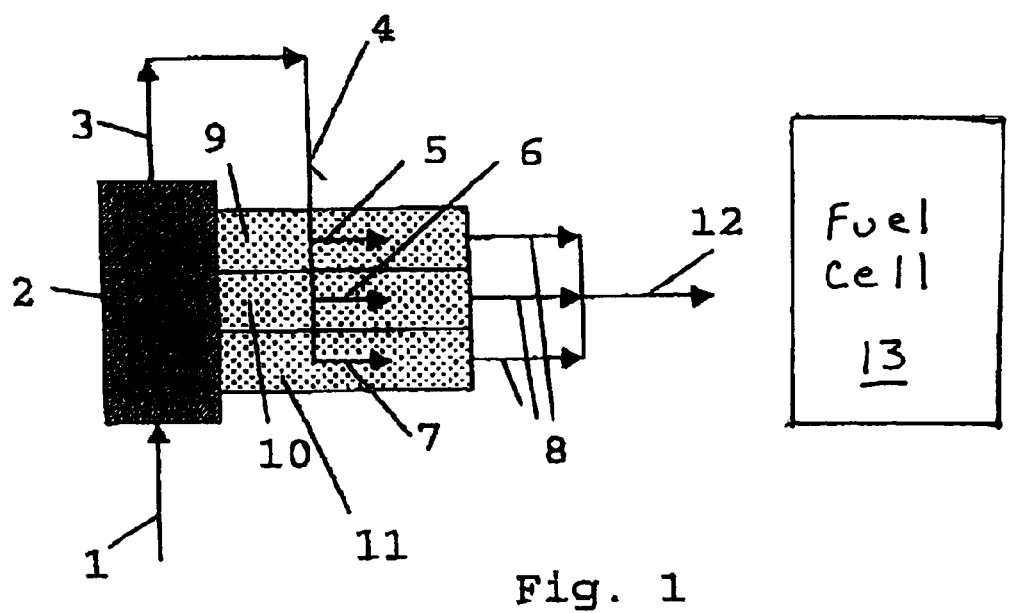
FIG. 1 shows a cross section through a preferred design of a device according to the present invention.

The basic principle of a device according to the present invention is illustrated with reference to FIG. 1. According to the present invention, an evaporation unit with downstream distribution unit is thermally coupled to a hot reaction zone, into which the evaporated starting material is metered from the evaporation unit. The area of the evaporation unit in which the evaporation takes place is in close proximity to the area of the hot reactor zone, preferably projecting into the reactor zone.

The device comprises a plurality of chambers 9, 10, 11 which are arranged above one another and preferably contain catalyst material. The catalyst material may be provided as a coating on the chamber walls and/or as catalyst-containing bodies and/or as a bed in the respective chambers 9, 10, 11 and/or as the boundary between the chambers 9, 10, 11.

Figure 2:
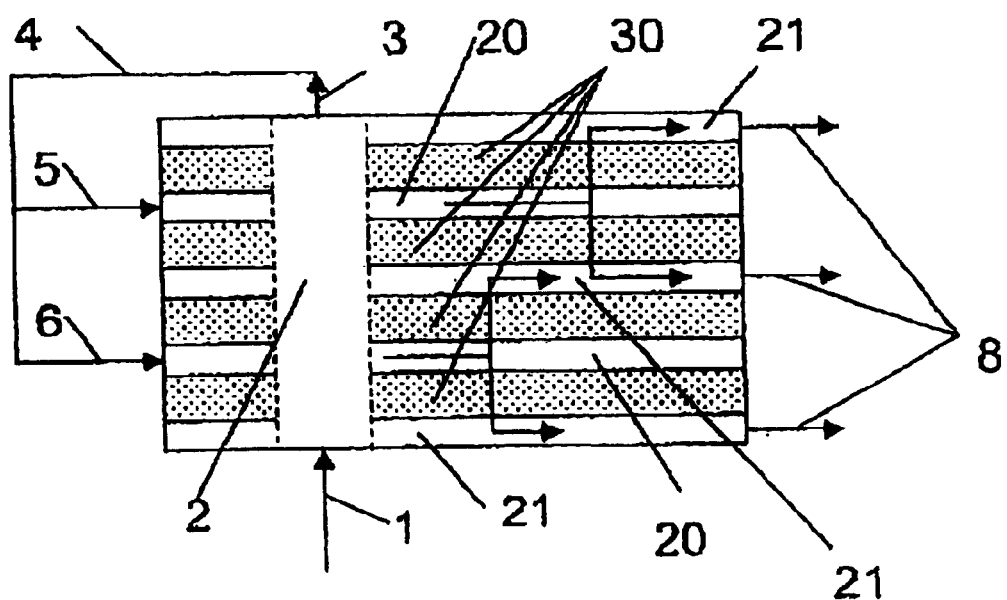
FIG. 2 shows a cross section through a further preferred design of the device according to the present invention.

An evaporation unit 2 in which a liquid starting material 1 is evaporated adjoins the chambers 9, 10, 11. The starting material is fed to the chambers 9, 10, 11 as starting-material vapor 3 via outlet means 5, 6, 7 of a distributor system 4. The evaporation unit 2 is in substantially direct contact with the hot reactor zone, preferably in direct contact with the hot catalyst layers of the chambers 9, 10, 11 (i.e., the area of the evaporation unit 2 in which the evaporation substantially takes place is at least partially surrounded by the chambers 9, 10, 11 and therefore by the hot reactor zone). The evaporation unit 2 may be arranged in such a way that it is completely surrounded by the chambers (as shown in FIG. 2), or it may be arranged on the edge region, in such a way that it is at least partially surrounded by the chambers 9, 10, 11 (e.g., that it laterally adjoins these chambers, as illustrated in FIG. 1). In this case, the evaporation area is in each case arranged at the level of the hot reactor zone of the chambers 9, 10, 11, substantially parallel thereto.

The introduction of heat takes place directly in this area as a result of heat from the chambers 9, 10, 11 being directly conferred into the evaporation unit 2, for example, via solid-state heat conduction from the hot catalyst material to the adjoining evaporation unit 2. A separate heat-transfer medium, such as for example a hot synthesis gas as in the prior art, is not needed in order to transfer the heat into the evaporation unit 2.

In the arrangement according to the present invention, the starting material 1 supplied firstly passes completely through the evaporation unit 2, and therefore also initially covers a distance which is perpendicular to the chambers 9, 10, 11. On its way through the evaporation unit 2, the starting material 1 also passes through the hot zone of the reactor, which is formed by the chambers 9, 10, 11 which are stacked on top of one another. On this path, the starting material is completely converted into the vapor phase. At the end of the evaporation unit 2, the starting material 3 is then present in the form of a vapor, enters the distributor system 4 and is returned to the chambers 9, 10, 11 by this system. The starting material 1 therefore passes through the reactor, or the stacked arrangement of the reactor, twice in practice, namely perpendicular to the stacked direction of the reactor firstly in one direction—in the evaporation unit 2—and then, in vapor form, in the opposite direction in the distribution system 4.

Preferably in each case one outlet 5, 6, 7 is assigned to each catalyst-containing chamber 9, 10, 11, in order to distribute the starting-material vapor 3 as uniformly as possible. In a preferred embodiment, one outlet 5, 6, 7 projects into the associated chamber 9, 10, 11. The starting material 3 in vapor form is admitted to the corresponding chambers 9, 10, 11 and is reacted in the chambers 9, 10, 11. The reaction generates heat, which in turn is made available for evaporation of the liquid starting material 1 in the evaporation unit 2. The device according to the present invention also has means 8, 12 which are known per se for discharging the products, the reacted products of the starting material 3 being passed out of discharge means 8 into a collection manifold 12. This configuration can be used to provide hydrogen to a fuel cell of a fuel cell system 13.

The evaporation unit 2 is in thermally conductive contact with preferably all the chambers 9, 10, 11. Preferably, there is a close, material-to-material contact between evaporation unit 2 and the hot zone of the reactor. The contact is substantially with the chambers 9, 10, 11 (for example the walls and/or the catalyst layers of the chambers 9, 10, 11). The connection itself may be fixed, so that there is substantially solid-state thermally conductive contact, or loose, so that heat can only be introduced via solid-state heat conduction at certain points, but also heat can be transferred by convection and/or thermal radiation.

The evaporation unit 2 preferably extends perpendicular to the chambers 9, 10, 11 or to their stack direction and is arranged laterally next to the chambers 9, 10, 11. The evaporation takes place in the same reactor zone (i.e., adjacent to the hot zone of the chambers 9, 10, 11, in which the heat for evaporation is also formed). The term "inside the chambers" is also understood in the same sense if the evaporation unit 2 laterally adjoins the chambers 9, 10, 11 parallel to their stack direction. This allows a very compact structure, since there is no need to provide a separate evaporator device outside the reactor, and the transfer of heat takes place substantially in the center of the evolution of heat in the chambers 9, 10, 11, and therefore there are only low heat losses.

The thermal coupling of the evaporation unit 2 to the chambers 9, 10, 11 is preferably such that substantially the same temperature prevails in all the chambers 9, 10, 11, i.e. that substantially the same amount of heat is dissipated into the evaporation unit 2 from each chamber. It is expedient for the coupling to be designed in such a manner that the coupling varies as a function of a temperature gradient in the evaporation unit 2. For example, if one area of the evaporation unit 2 is cold and would therefore extract large amounts of heat from the adjoining chamber, the coupling to the adjoining chamber 9, 10 or 11 is preferably made weaker than at an area of the evaporation unit 2 which is at a high temperature and therefore requires less heat from the adjoining chamber 9, 10 or 11 and can be coupled better to this chamber. The thermal coupling is preferably designed to vary in a manner which is inversely proportional to the temperature gradient in the evaporation unit 2. The result is that the temperature of the chambers 9, 10, 11 is as far as possible uniform and overall the device can operate under homogeneous conditions.

However, by varying the thermal coupling between chambers 9, 10, 11 and evaporation unit 2, it is also possible to set a specific temperature gradient between the chambers 9, 10, 11.

Preference is given to a stacked arrangement of chambers 9, 10, 11 in which the individual chambers 9, 10, 11 are substantially identical. A preferred stacked reactor in this case comprises catalyst-containing chambers 9, 10, 11 which follow one another at a distance or without a distance from one another and to which the evaporation unit 2 is thermally coupled. The evaporation unit 2 may in this case be designed as a continuous tube of metallic material, through which the starting material 1 to be evaporated is passed. The tube may either be fixedly connected to the chambers 9, 10, 11 or may simply be guided loosely through them, in order to ensure the advantages of a movable arrangement which have been outlined above. Both fixed and loose connection of the evaporation unit 2 allow direct contact with the catalyst layers or the chambers 9, 10, 11 in accordance with the present invention.

Since the starting material 3 is in vapor form in the outlet means 5, 6, 7, the outlet means 5, 6, 7 may also be thermally coupled to the chambers 9, 10, 11 and/or the catalyst material in the chambers without there being any risk of an adverse effect on the uniform distribution of the starting materials in the chambers 9, 10, 11. Since the starting material 3 evaporates completely in the evaporation unit 2, it is impossible for there to be any pulsating movements of the liquid starting material 1 in the outlet means 5, 6, 7, which would disrupt the uniform distribution.

FIG. 2 shows a further preferred embodiment of the present invention. A plurality of chambers 20 are arranged above one another and are spaced apart from one another by catalyst-containing material, preferably by sintered catalyst discs 30. A channel which runs perpendicular to the stacked arrangement and contains an evaporation unit 2 is provided in the interior of the stacked arrangement of chambers 20, 21 and catalyst discs 30. The evaporation unit 2 is preferably in intimate thermal contact with the chambers 20 and/or the catalyst discs 30. The evaporation unit 2 is surrounded by the chambers 20, 21. Liquid starting material 1 is fed into the evaporation unit 2 and, as described above, is completely evaporated as it passes through the evaporation unit 2. The porous catalyst discs are expediently sealed with respect to the evaporation unit 2, in such a way that they are unable to suck up any liquid starting material 1 from the evaporation unit 2.

After the starting material 3, which is now in vapor form, has passed through the area of the evaporation unit 2 in which the evaporation takes place, it is passed to the outlet means 5, 6 via a distributor system 4 and enters the chambers 20 at these outlet means. The starting material 3 in vapor form passes through the catalyst discs 30, where it is reacted, and then enters the adjoining collection manifolds 21 and is discharged via means 8 for discharging the products. In this case too, the starting material initially flows in a direction along the stack direction and is then diverted and fed back in the opposite direction in the distributor system 4 and is distributed within the reactor.

An advantage is that the device according to the present invention allows all the substantially identical chambers to operate very uniformly, since the starting material can enter the chambers 20 and reach the catalyst material 30 in a substantially uniform distribution.

Figure 3:
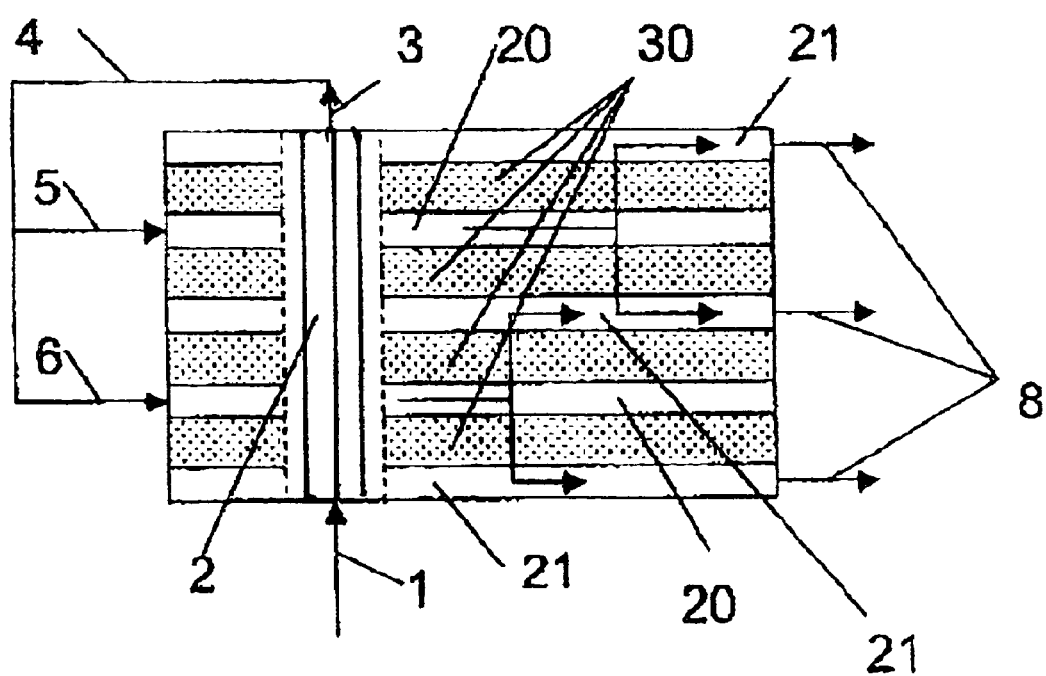
FIG. 3 shows an embodiment in which the evaporation unit comprises a plurality of channels.

In a preferred configuration, the evaporation unit comprises a plurality of channels as shown in FIG. 3 which are arranged parallel to one another, since it is expedient to supply a plurality of smaller channels of the evaporation unit with heat than to supply a large central evaporation unit. The surface area of the evaporation unit is increased, which leads to improved heat transfer between catalyst layer and evaporation unit. The branching also readily allows multiple contact with the catalyst layers, for example by an arrangement in which one or more bores are guided onto each catalyst layer, and the evaporation unit is then arranged in these bores. However, this too is dependent on the reactor design and the reaction which is to be carried out.

The present invention is particularly suitable for reactors in which an operating medium, such as hydrocarbons, ethers and/or alcohols, preferably methanol, for a fuel cell is to be subjected to hydrogen recovery in a reforming reaction. A preferred reactor is an autothermal reforming reactor which may be constructed in accordance with the exemplary embodiments shown in FIG. 1 or FIG. 2. Hydrogen is obtained from the operating medium by a catalytic reaction, preferably with a copper-containing catalyst. The temperature required can be achieved by adding oxygen to the reforming reactor, so that some of the evaporated operating medium is oxidized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for carrying out a solid-catalyzed reaction, comprising:
   a plurality of chambers, each chamber comprising a catalyst; and
   a common evaporation unit for evaporating liquid starting materials, wherein the evaporation unit is in thermally conductive contact with the plurality of chambers,
   wherein an area of the evaporation unit in which evaporation of the liquid starting materials substantially takes place is at least partially surrounded by the plurality of chambers.

2. A device according to claim 1, wherein the evaporation unit is entirely surrounded by the chambers.

3. A device according to claim 1, wherein the evaporation unit is arranged in an edge region of the plurality of chambers, such that it adjoins the plurality of chambers.

4. A device according to claim 1, wherein the evaporation unit is substantially in direct contact with catalyst layers of the plurality of chambers.

5. A device according to claim 1, wherein the evaporation unit is rigidly connected to the plurality of chambers.

6. A device according to claim 1, wherein the evaporation unit is movably connected to the plurality of catalyst-containing chambers.

7. A device according to claim 1, wherein the evaporation unit is thermally coupled to the plurality of chambers such that the thermal coupling varies with a temperature gradient in the evaporation unit.

8. A device according to claim 7, wherein the thermal coupling is designed to be variable in an inversely proportional manner to the temperature gradient.

9. A device according to claim 1, wherein the evaporation unit comprises a plurality of parallel channels.

10. A device according to claim 1, wherein the starting material is a hydrocarbon.

11. A device according to claim 10, wherein the hydrocarbon is at least one of an ether or an alcohol.

12. A fuel cell system comprising a device according to claim 1.

13. A device for generating a gaseous fuel, comprising:
   a catalytic reactor for performing a catalytic reaction in which said gaseous fuel is generated, said catalytic reactor comprising a plurality of chambers, each of said chambers containing a catalyst material that is used in said catalytic reaction; and
   an evaporator unit for evaporating liquid starting materials, said evaporator unit being in thermal contact with the plurality of chambers comprised by the catalytic reactor;
   wherein, an interface between said evaporator unit and said catalytic reactor is three dimensional, such that said evaporator is at least partially surrounded by said plurality of chambers.

14. A device according to claim 13, wherein the evaporation unit is entirely surrounded by the chambers.

15. A device according to claim 13, wherein the evaporation unit is arranged in an edge region of the plurality of chambers, such that it adjoins the plurality of chambers.

16. A device according to claim 13, wherein the evaporation unit is movably connected to the plurality of catalyst-containing chambers.

* * * * *